Jan. 1, 1952     C. H. KAIN     2,580,433
VALVE
Filed Nov. 30, 1944
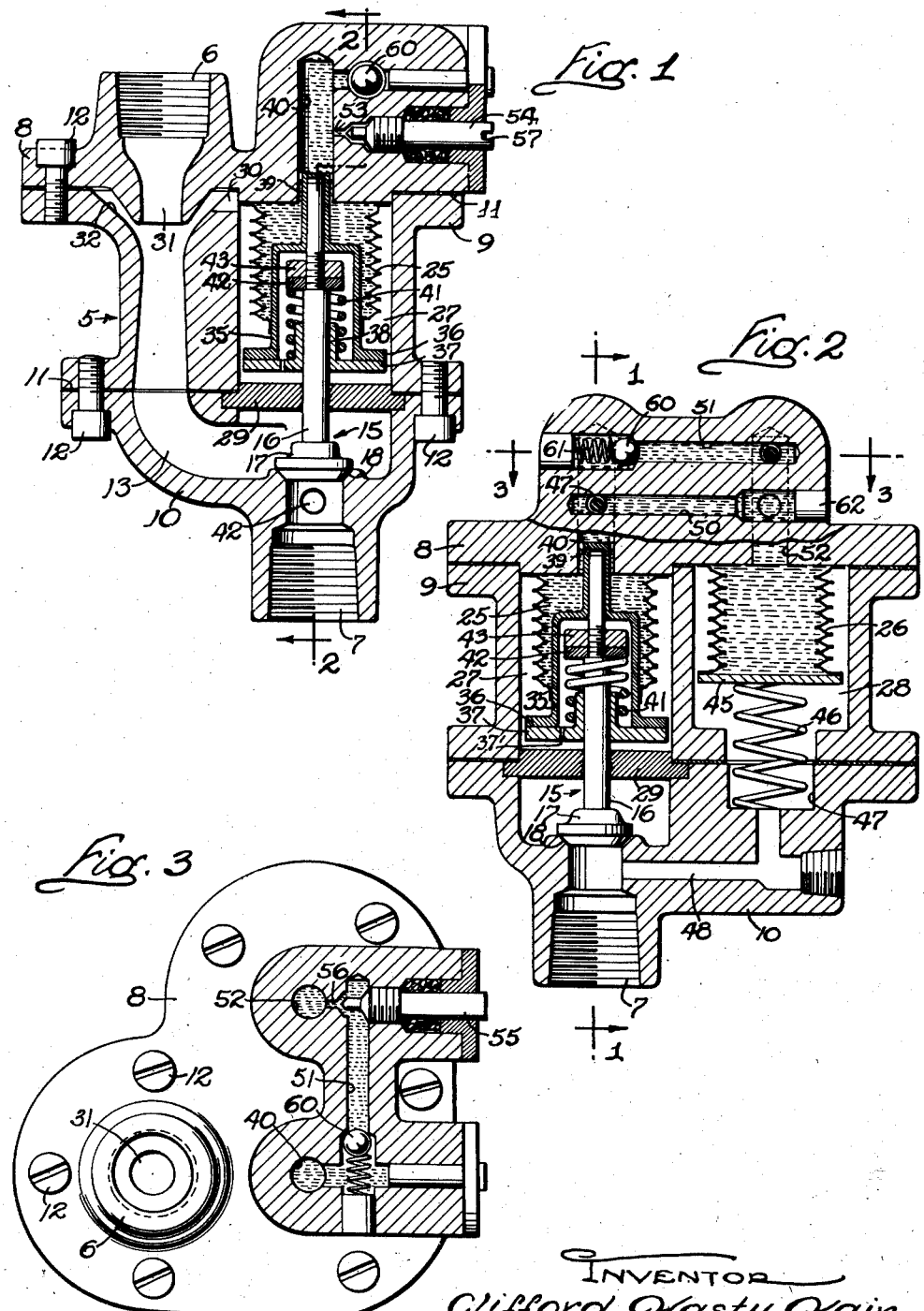

Patented Jan. 1, 1952

2,580,433

UNITED STATES PATENT OFFICE 2,580,433

VALVE

Clifford Hasty Kain, Los Altos, Calif.

Application November 30, 1944, Serial No. 565,904

9 Claims. (Cl. 137—145)

The invention relates generally to valves and more particularly to an improved valve of the type adapted for periodic automatic operation.

One object of the invention is to provide a valve suitable for controlling the flow of fluid under pressure and adapted to be opened and closed automatically for accurately timed intervals by the pressure of the fluid whose flow is to be controlled.

Another object is to provide actuating mechanism for valves of the above general character operable automatically to periodically open and close the valve and to determine the length of both the open and closed periods.

Another object is to provide automatic pressure operated valve actuating mechanism which is readily adjustable to regulate the open and closed periods of the valve.

Still another object is to provide an automatic valve in which the actuating and timing mechanism is operated by a confined fluid such as oil under the influence of pressure derived from the fluid whose flow is to be controlled thus effectually protecting the mechanism from deposits of foreign material or corrosion by the fluid and rendering its operative efficiency and accuracy completely independent of leakage, wear or maladjustment of the valve parts.

A further object is to provide a valve actuating mechanism operative to open and close the valve periodically in a positive manner and with a snap action.

It is also an object of the invention to provide an automatic self-timing periodically operating valve of simple and rugged construction capable of operating efficiently and accurately over long periods without attention.

Other objects and advantages of the invention will become apparent from the following detailed description of the preferred embodiment illustrated in the accompanying drawing in which:

Figure 1 is a sectional view through the valve taken in a vertical plane substantially on line 1—1 of Fig. 2.

Fig. 2 is a sectional view of the valve taken in a vertical plane substantially on the line 2—2 of Fig. 1.

Fig. 3 is a sectional view of the valve taken in a horizontal plane substantially on the line 3—3 of Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the improved valve has been shown in a form particularly suitable for controlling the periodic flow of water as required in the automatic flushing of urinals. For this purpose the valve includes suitable means such as a movable valve member or plunger shiftable to permit or interrupt the flow of water through the valve.

It will be understood, of course, that the valve may be used for other purposes than flushing urinals and may also be used for controlling the flow of fluids other than water.

In carrying out the invention, novel mechanism deriving its power from the pressure of the fluid whose flow is to be controlled, is provided for automatically shifting the valve plunger between open and closed positions and for timing the open and closed periods thereof. To avoid the deleterious effects of suspended material and chemical elements in solution in the water ordinarily available for flushing purposes, the mechanism is constructed and arranged to utilize a confined body of liquid such as oil for the performance of its valve actuating and timing functions.

In the preferred form of the mechanism, the actuating liquid is confined within a closed fluid system including a pair of independently compressible members forming liquid containing chambers interconnected so that liquid may be forced from either member to the other by application of a suitable compressive force thereto. An operative connection is provided between one of the members and the valve plunger to enable the member to shift the plunger to open position when a predetermined quantity of liquid has been forced therefrom and to shift the plunger back to closed position when the liquid is returned thereto. Provision is made whereby the compressive force for actuating said one member is derived from the fluid whose flow is to be controlled, the member being subjected to the pressure of the fluid when the valve plunger is in closed position and the pressure being relieved automatically upon movement of the plunger to open position. A compressive force applied continuously to the other member as by a spring serves to return the liquid to the first mentioned member and thus effect closure of the valve. By metering the flow of liquid from one member to the other, the open and closed intervals of the valve may be accurately timed.

Referring to the drawing, the improved valve in its preferred form comprises a body or casing 5 having an inlet port 6 adapted to be connected to a source of fluid under pressure, and an outlet port 7 through which the fluid is to be discharged periodically. To facilitate manufacture and assembly of the valve, the casing 5 is conveniently constructed in three sections, namely, an end section 8, an intermediate section 9 and an end section 10. The sections are assembled in superimposed relation with suitable gaskets 11 interposed between them and are rigidly secured together as by machine screws 12. In the exemplary valve, the inlet port 6 is formed in the end section 8 and the outlet port 7 is formed in the end section 10. A passage 13 extending through each of the sections connects the inlet and outlet ports.

Fluid flow through the valve is controlled by a movable valve member or plunger 15 cooperating with the outlet port 7 to open or close the same. As herein shown, the plunger 15 comprises an elongated stem 16 having a cylindrical head 17 at one end suitably tapered for coaction with a tapered valve seat 18 formed in the casing 10 around the inner end of the outlet port 7.

Movement of the plunger 15 to close and open the outlet port 7 is effected periodically by automatic actuating mechanism which is also effective to time the open and closed periods of the valve. As stated heretofore, the mechanism operates through the medium of a body of liquid such as oil confined within a closed fluid system including a pair of independently expansible and contractible liquid containing members 25 and 26. In the particular valve illustrated, the members 25 and 26 comprise axially expansible and contractible cylindrical chamber forming elements herein shown as bellows of corrugated sheet metal or other suitable material closed at opposite ends to form liquid tight chambers.

To accommodate the members 25 and 26, the casing section 9 is formed to provide two generally cylindrical compartments 27 and 28 both opening through the top and bottom walls of the section. The compartments thus formed are arranged in side-by-side relation with the compartment 27 disposed directly above the outlet port 7 in a position to receive the stem 16 of the valve plunger when the casing sections are assembled. The passage 13 connecting the inlet and outlet ports is accordingly made generally L-shaped and is arranged to extend upwardly along the back of the compartment 27. The chamber 27 is closed at its lower end by a partitioning member 29 interposed between the casing sections 9 and 10 and having a central hole dimensioned to permit the valve stem 16 to slide therein while substantially preventing leakage around the stem. Communication between the passage 13 and the chamber 27 is provided by an opening 30 in the casing wall adjacent the upper end of the casing section.

As will be seen by the reference to Fig. 1 of the drawing, the passage 13 is shaped to form a Venturi tube whereby a partial vacuum is established at the upper end of the passage when fluid flow therethrough is substantially unrestricted. To this end, the casing section 8 is former on its underside to provide a nozzle 31 having a somewhat restricted outlet. The adjacent portion of the casing section 9, in turn, is formed to provide an inlet cone 32 in axial alinement with the nozzle 31. When the outlet port 7 is closed, the passage 13 fills with fluid which enters the compartment 27 by way of the opening 30. Upon opening the outlet port, the fluid is exhausted from the passage 13 and the fluid entering through the port 6 is projected in a jet through the nozzle 31 thus creating a partial vacuum around the nozzle which is reflected in the compartment 27 by reason of the opening 30.

The bellows 25 is mounted within the compartment 27 so as to be subjected to the alternate pressure and partial vacuum conditions in the compartment resulting from the shifting of the plunger 15 between closed and open positions. To this end, the upper marginal edge portion of the bellows is secured to the underside of the casing section 8 with a liquid tight seal. A cup-shaped cap member 35 closes the lower end of the bellows, the latter being telescoped over the cap member and having its lower marginal edge portion secured to the peripheral wall of the member so as to form a liquid tight seal therewith. At its lower end, the cap member 35 is formed with a circumferential flange 36 to which is attached a guide plate 37 having a vent 37' and a central opening encircled by a sleeve-like extension 38 dimensioned to slidably receive the valve stem 16. A tubular extension 39 at the inner end of the cap member is arranged to slidably receive the valve stem 16 which is preferably flattened on one side to prevent rotation. The casing section 8 is recessed as at 40 for the reception of the extension 39.

A lost-motion connection is provided between the valve plunger 15 and the bellows 25 whereby the latter is enabled to shift the plunger between open and closed positions. The connection in this instance includes a coiled compression spring 41 interposed between the guide plate 37 and an abutment 42 rigid with the valve. As herein shown, the abutment 42 is in the form of a washer and is rigidly clamped between a shoulder on the valve stem and a nut 43 threaded thereon.

The bellows 26 is similarly mounted within the compartment 28 with its upper marginal edge portion sealed to the lower surface of the casing section 8. A cap or end plate 45 (Fig. 2) closes the lower end of the bellows. A continuous compressive force is exerted on the bellows by a spring 46 bearing against the end plate 45, the spring being constructed so that the compressive force exerted is slightly less than that exerted on the bellows 25 when fluid is supplied to the valve at minimum pressure. As herein shown, the casing section 10 is recessed as at 47 to provide a seat for the spring. The chamber 28 is vented through a passage 48 extending from the recess 47 to the outlet port 7 below the valve seat 18.

The liquid confining chambers formed by the bellows 25 and 26 are suitably interconnected so that liquid may flow from either chamber to the other according to the compressive force applied thereto. The connection is provided, in this instance, by ducts formed within the casing section 8, the exemplary valve having two such ducts 50 and 51 to provide for independent regulation of the open and closed periods of the valve. As herein shown, the ducts extend transversely through the casing section from the recess 40 associated with the chamber formed by the bellows members 25 to a similar recess 52 communicating with the chamber formed by the bellows 26.

To regulate the rate of flow, each of the passages is provided with adjustable flow restricting means preferably in the form of needle valves. Thus the passage 50 is connected with the recess 40 by a restricted branch passage 53 (Fig. 1) and fluid flow therethrough is controlled by a needle valve member 54 threaded into the casing structure. A similar needle valve member 55 cooperating with a restricted opening 56 connecting the passage 51 with the recess 52 controls the flow of fluid through that passage. The stems of the valve members 54 and 55 are arranged to project at the front of the valve casing and are suitably shaped for the reception of a tool, the stems being slotted as at 57, in this instance, for engagement by a screw driver. Thus by adjusting the needle valves, the rate of flow of liquid through the passages 50 and 51 and consequently the time required to exhaust the liquid from one bellows chamber to the other can be accurately regulated.

In the particular valve illustrated, a ball check 60 urged against its seat by a spring 61 is arranged to prevent the flow of liquid through the passage 51 from bellows 25 to the bellows 26 while permitting flow in the opposite direction. Accordingly, all fluid exhausted from the bellows 25 is directed through the passage 50 and under control of the needle valve 54 which is thus effective to time the closed period of the valve plunger 15. Liquid exhausted from the bellows 26 on the other hand, is directed through both passages 50 and 51 under control of the two needle valves associated therewith. Liquid may therefore be exhausted more rapidly from the bellows 26 than from the bellows 25 but independent regulation of the rate of flow may be obtained by adjustment of the needle valve 55.

The foregoing arrangement is particularly suitable where the closed period of the valve is to be substantially longer than the open period. Thus, when used as an automatic flushing valve for urinals, the closed periods may be approximately five minutes with open or flushing periods of about thirty seconds. When the valve is to be used under conditions which require open periods more nearly equal in length to the closed periods, a check valve may be provided for the passage 50, the casing section 8 being constructed with an opening for this purpose which is normally closed by a plug 62.

In use, the inlet port 6 of the valve is connected to a source of fluid under pressure, such as a pipe connecting with the usual water mains, while the outlet port 7 is connected with the discharge pipe leading to the apparatus to which the fluid is to be delivered. With the valve plunger 15 in closed position, fluid flow through the inlet port 6 fills the passage 13 and enters the bellows chamber 27 by way of the opening 30 and around the valve stem clearance hole in the partitioning member 29.

The fluid in the passage 13 exerts pressure on the head 17 of valve plunger 15 tending to maintain the plunger seated in closed position. However, a much greater compressive force is exerted on the bellows 25 due to the larger effective area of the same thus forcing the liquid therein through the passage 50 and into the bellows 26 at a rate determined by the setting of the needle valve 54. In the initial collapsing movement of the bellows 25, the spring 41 is compressed to store up energy for shifting the plunger to the open position with a snap action. The valve plunger remains in closed position, however, until the sleeve 38 engages the abutment 42 to positively raise the plunger and thus break the seal around the valve head. Upon such initial movement of the valve plunger, pressure is equalized on both sides of the head 17, thus permitting the spring 41 to expand and shift the plunger rapidly to its upper position thereby opening the outlet port 7 for flow of fluid through the valve.

As the fluid is exhausted from the bellows 25 into the chamber formed by the bellows 26, the latter is expanded to compress the spring 46. Upon movement of the valve plunger 15 to the open position, the pressure on the bellows 25 is immediately relieved, thereby enabling the spring 46 to force the fluid in the bellows 26 back into the bellows 25 to expand the same. The action of the spring 46 is assisted in this instance by the partial vacuum established in the bellows chamber 27 by the jet discharged through the nozzle 31. To maintain the partial vacuum, the upper surface of the valve head 17 is formed so as to substantially seal the valve stem opening in the partitioning plate 29 when the valve plunger is in open position.

Return of the valve plunger 15 to closed position is insured in the event of fluid flow being blocked beyond the outlet port 7 by the vent 48 connecting with the bellows chamber 28. Under such conditions, fluid backing up in the discharge line will exert a compressive force on the bellows 26 substantially equivalent to the reduction in the aspirating effect of the jet from the nozzle 31. If the fluid flow is completely blocked, the vent serves to equalize the compressive force exerted on both bellows by the fluid thus enabling the spring 46 to return the valve plunger to closed position.

The time required to force the fluid from the bellows 26 to the bellows 25 is determined by the setting of the needle valves 55 and 56 and in this instance, will be substantially shorter than the interval required to force the fluid in the opposite direction. As the bellows 25 expands, the plunger 15 is shifted toward the outlet port. When the valve head 17 approaches its seat, the pressure on the upper surface thereof takes effect to quickly and positively effect a closure of the valve.

It will be apparent from the foregoing that the invention provides an automatic valve of novel and advantageous construction for controlling the periodic flow of fluid under pressure. Power for actuating the valve is derived entirely from the pressure of the fluid whose flow is to be controlled, thus eliminating floats and other extraneous apparatus and material simplifying the construction of the valve. The actuating mechanism, in addition to opening and closing the valve, is also operative to accurately time the open and closed periods. Provision is made for adjusting the open and closed periods independently with the result that the range and usefulness of the valve is greatly extended. Moreover, by reason of its novel construction and mode of operation, the actuating and timing mechanism is entirely free from trouble due to wear of the valve parts, corrosion, or the deposit of material suspended in the fluid flowing through the valve. Accordingly, the valve has a long useful life and is capable of functioning efficiently and accurately over long periods without attention.

I claim as my invention:

1. In an automatic valve, in combination, means defining a passage for receiving fluid under pressure, said passage terminating in an outlet port, a valve member shiftable to open or close said port, a liquid filled bellows, means providing a lost-motion connection between said bellows and said valve member, said bellows having an outlet, an opening from said passage for subjecting said bellows to the pressure of the fluid therein when the valve member is in the closed position whereby said bellows is compressed and the liquid therein discharged through said outlet, said bellows operating through said lost-motion connection to shift said valve member to open position upon discharge of a predetermined quantity of the liquid therefrom, and valve means controlling the rate of discharge from said bellows.

2. In an automatic valve, in combination, means defining a flow passage for fluid under pressure, said passage having an outlet port, a valve member shiftable to open or close said port, a liquid filled bellows having a lost-motion connection with said valve member, said bellows communicating with an inlet passage and a combined inlet and outlet passage, and opening from said flow passage for subjecting said bellows to the pressure of the fluid therein whereby said bellows is compressed and the liquid therein discharged through said combined inlet and outlet passage when said valve member is in closed position, said bellows acting through said connection to shift said valve member to open position upon discharge of a predetermined quantity of liquid therefrom, means operative when the pressure on said bellows is relieved to deliver liquid thereto through said inlet passage to expand the same, said bellows when expanded acting through said connection to shift said valve member back to closed position, and means for controlling the rate of liquid flow to and from said bellows to regulate the open and closed intervals of the valve.

3. In an automatic valve, in combination, a casing having an inlet port adapted to be connected to a source of fluid under pressure, an outlet port in said casing, a valve member shiftable relative to said outlet port to open or close the same, a pair of expansible and contractible elements within said casing each forming a closed chamber, ducts connecting said chambers, said chambers and said ducts being filled with liquid, a passage in said casing for subjecting one of said elements to the pressure of the fluid when said outlet port is closed whereby the member is contracted and the liquid forced therefrom into the other element, means providing an operative connection between said one element and said valve member operative to shift the valve member to open position incident to the contraction of the element, and means acting continuously on said other elements and operative when the pressure on said one element is relieved for forcing the liquid back into said one element to expand the same and thereby shift said valve member back to closed position.

4. In an automatic valve, in combination, a casing having an inlet port adapted to be connected to a source of fluid under pressure, an outlet port, a passage connecting said ports, a valve member shiftable to open or close said outlet port, a compartment in said casing, a compressible bellows disposed in said compartment, an opening connecting said compartment with said passage whereby fluid under pressure is introduced therein to compress said bellows when said valve member is in closed position, and means providing a lost-motion connection between said bellows and said valve member operative to shift said valve member to open position in response to a predetermined compression of said bellows and thereby initiate the flow of fluid through said outlet port, said passage being formed so that the fluid flow therein is effective to reduce the pressure in said chamber and thereby promote the extension of said bellows.

5. In a valve, in combination, a valve member movable between open and closed positions to control the flow of fluid under pressure, mechanism for shifting said valve member comprising a closed fluid system including a pair of individually compressible fluid containing members, one of said compressible members having a lost-motion connection with said valve member, means exerting a continuous pressure on the other of said compressible members to force the fluid therefrom into said one member whereby to expand the same and shift said valve member to its closed position, means effective when said valve member is in closed position for subjecting said one compressible member to the pressure of the fluid whose flow is to be controlled, the pressure exerted on said other member being less than the pressure of the fluid so that said one member is compressed to force the fluid therefrom into said other member, said one member acting through said lost-motion connection to shift said valve member to open position when a predetermined quantity of fluid is forced therefrom, and adjustable means for regulating the rate at which fluid is forced from said one member to determine the closed interval of said valve member.

6. In a valve, in combination, a valve member movable between open and closed positions to control the flow of fluid under pressure, mechanism for shifting said valve member comprising a closed fluid system including a pair of individually compressible fluid containing members, one of said compressible members having a lost-motion connection with said valve member, means exerting a continuous pressure on the other of said compressible members to force the fluid therefrom into said one member whereby to expand the same and shift said valve member to its closed position, means effective when said valve member is in closed position for subjecting said one compressible member to the pressure of the fluid whose flow is to be controlled, the pressure exerted on said other member being less than the pressure of the fluid so that said one member is compressed to force the fluid therefrom into said other member, said one member acting through said lost-motion connection to shift said valve member to open position when a predetermined quantity of fluid is forced therefrom, and adjustable means for regulating the rate of flow from either of said compressible members to the other member to determine the open and closed intervals of said valve member.

7. In a valve, in combination, a valve member movable between open and closed positions to control the flow of fluid under pressure, mechanism for shifting said valve member comprising a closed fluid system including a pair of individually compressible fluid containing members, one of said compressible members having a lost-motion connection with said valve member, means exerting a continuous pressure on the other of said compressible members to force the fluid therefrom into said one member whereby to expand the same and shift said valve member to closed position, means effective when said valve member is in closed position for subjecting said one compressible member to the pressure of the fluid whose flow is to be controlled, the pressure exerted on said other member being less than the pressure of the fluid so that said one member is compressed to force the fluid therefrom into said other member, said one member acting through said lost-motion connection to shift said valve member to open position when a predetermined quantity of fluid is forced therefrom, valve means for adjustably controlling the rate of fluid flow between said compressible members in one direction to regulate the closed interval of said valve member, and other valve means for adjustably controlling the rate of fluid flow between said compressible members in the other direction to regulate the open interval of said valve member.

8. In a valve for controlling the flow of fluid under pressure, in combination, a plunger movable between open and closed positions, a pair of interconnected bellows members adapted to be expanded and contracted alternately, means providing an operative connection between one of said bellows members and said plunger effective to move the plunger toward the closed position when the member is expanding and toward the open position when the member is contracting, means for subjecting said one member to the pressure of the fluid whose flow is to be controlled when said plunger is in the closed position to effect the contraction of the member, and means for subjecting said one member to a partial vacuum produced by the flow of fluid through the valve when the plunger is in open position, said partial vacuum assisting in the expansion of the member.

9. In a valve for controlling the periodic flow of fluid under pressure, a casing having fluid inlet and outlet ports, a plunger movable to open and close said outlet port, operating mechanism for said plunger including a pair of independently expansible and contractible chamber forming members enclosed in said casing, said casing having a passage interconnecting said chambers, said passage and said chambers being filled with liquid, one of said members being subjected to the pressure of the fluid at said inlet port when the outlet port is closed whereby the member is contracted and the liquid forced therefrom into the other of said members, means acting on said other member to force the liquid therefrom and back into said one member to expand the same when the pressure thereon is relieved, and a connection between said plunger and said one member effective to move the plunger to open said outlet port when the member is contracted and to close the outlet port when the member is expanded.

CLIFFORD HASTY KAIN.

REFERENCES CITED

The following references are of record in the file of this patent:

UNITED STATES PATENTS

| Number | Name | Date |
|---|---|---|
| 1,764,193 | Bruehl | June 17, 1930 |
| 1,796,941 | Pottenger | Mar. 17, 1931 |
| 1,828,206 | Simmons | Oct. 20, 1931 |
| 2,127,293 | Gilman | Aug. 16, 1938 |
| 2,251,323 | Burk | Aug. 5, 1941 |
| 2,361,773 | Knapp | Oct. 31, 1944 |